United States Patent
Uchida

(10) Patent No.: US 8,918,052 B2
(45) Date of Patent: Dec. 23, 2014

(54) COMMUNICATION CONTROL APPARATUS, COMMUNICATION CONTROL METHOD AND PROGRAM

(75) Inventor: Norio Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 267 days.

(21) Appl. No.: 13/513,162

(22) PCT Filed: Nov. 26, 2010

(86) PCT No.: PCT/JP2010/071628
§ 371 (c)(1),
(2), (4) Date: May 31, 2012

(87) PCT Pub. No.: WO2011/068180
PCT Pub. Date: Jun. 9, 2011

(65) Prior Publication Data
US 2012/0244887 A1    Sep. 27, 2012

(30) Foreign Application Priority Data

Dec. 1, 2009    (JP) .................................. 2009-273637

(51) Int. Cl.
| | |
|---|---|
| *H04B 7/00* | (2006.01) |
| *G06K 7/10* | (2006.01) |
| *H04B 5/00* | (2006.01) |
| *G01S 13/74* | (2006.01) |

(52) U.S. Cl.
CPC .......... *H04B 5/0062* (2013.01); *G06K 7/10257* (2013.01); *G01S 13/74* (2013.01)
USPC ........ 455/41.2; 455/418; 455/456.4; 455/517

(58) Field of Classification Search
CPC ... G01S 13/46; G01S 2013/466; G01S 13/84; H04L 63/0492; H04L 63/06; H04L 63/10; H04W 12/04; H04W 48/04; H04W 84/12; G08B 21/24
USPC .......... 455/67.11, 67.16, 67.14, 67.12, 67.15, 455/67.13, 115.2, 226.2, 115.1, 115.3, 63.4, 455/115.4, 517–519, 41.2, 456.1–457, 455/418–420, 410–411
See application file for complete search history.

(56) References Cited

U.S. PATENT DOCUMENTS

| | | | |
|---|---|---|---|
| 7,463,890 B2 * | 12/2008 | Herz et al. ..................... | 455/445 |
| 7,663,502 B2 * | 2/2010 | Breed ......................... | 340/12.25 |

(Continued)

FOREIGN PATENT DOCUMENTS

| | | | | |
|---|---|---|---|---|
| JP | 2007-079665 A | | 3/2007 | |
| JP | 2007292744 | * | 8/2007 | .............. G01S 13/74 |

(Continued)

OTHER PUBLICATIONS

International Search Report of PCT/JP2010/071628 dated Feb. 22, 2011.

*Primary Examiner* — Sharad Rampuria
(74) *Attorney, Agent, or Firm* — Sughrue Mion, PLLC

(57) ABSTRACT

In a case where a communication control apparatus incorporated by a portable device detects a communication request from an external device and decides whether to perform communications, it is hard to determine, with a high degree of precision, whether the owner of the portable device incorporating the communication control apparatus has an intention to use the portable device in response to the communication request. In order to solve this problem, there are included a distance measuring means for measuring spatial distances from any given objects that have distances of a particular range in a direction of a particular range and that are adjacent to each other; a condition storing means for storing predetermined distance conditions; and a communication means that becomes, based on a result of comparison of the values of the spatial distances with the distance conditions, communicatable in response to the externally received communication request.

24 Claims, 15 Drawing Sheets

(56) References Cited

U.S. PATENT DOCUMENTS

| | | | |
|---|---|---|---|
| 7,668,556 B2* | 2/2010 | Yokoshi et al. | 455/456.3 |
| 7,787,886 B2* | 8/2010 | Markhovsky et al. | 455/456.1 |
| 8,634,796 B2* | 1/2014 | Johnson | 455/404.1 |
| 8,676,123 B1* | 3/2014 | Hinkle | 455/41.2 |
| 2003/0220765 A1* | 11/2003 | Overy et al. | 702/158 |
| 2006/0107307 A1 | 5/2006 | Knox et al. | |
| 2010/0227556 A1* | 9/2010 | Kim et al. | 455/41.2 |
| 2012/0258731 A1* | 10/2012 | Smith et al. | 455/456.1 |

FOREIGN PATENT DOCUMENTS

| | | |
|---|---|---|
| JP | 2007-292744 A | 11/2007 |
| JP | 2008-502981 A | 1/2008 |
| JP | 2008-514920 A | 5/2008 |
| JP | 2008-153715 A | 7/2008 |
| JP | 2010-166369 A | 7/2010 |

* cited by examiner

COMMUNICATION CONTROL APPARATUS, COMMUNICATION CONTROL METHOD AND PROGRAM

CROSS REFERENCE TO RELATED APPLICATIONS

This application is a National Stage of International Application No. PCT/JP2010/071628 filed Nov. 26, 2010, claiming priority based on Japanese Patent Application No. 2009-273637 filed Dec. 1, 2009, the contents of all of which are incorporated herein by reference in their entirety.

TECHNICAL FIELD

The present invention relates to a communication control apparatus, a communication control method and a program, and in particular relates to a communication control apparatus, a communication control method and a program which control whether or not it enables a communication.

BACKGROUND ART

In recent years, a communication system using a technology of near field wireless communication is rapidly becoming popular. In this kind of communication system, a portable device equipped with near field wireless communication function (e.g. mobile phones and Contact-Less ICs (Integrated Circuit) card) and an external device (e.g. IC card readers/writers) can communicate each other by the near field wireless communication.

Communications among these devices using the near field wireless communication do not require a physical contact between the devices. Therefore, even if obstacles may exist between these devices, in the case that the obstacles do not shelter electromagnetic wave, it is possible to communicate between the devices.

Accordingly, for example, in the case of installing and using a passenger ticket function of a train or bus on a portable device, a passenger can get an advantage that he/she merely places the portable device over an IC card reader/writer which is installed in an automatic ticket gate, when he/she passes the ticket gate.

Moreover, the IC card reader/writer of this kind of automatic ticket gate has less attrition compared with the automatic ticket gate having a driving mechanism for inserting and extracting the passenger ticket or a season pass. Accordingly, it can get advantages including such as reducing a maintenance cost and keeping high availability.

However, while a feature of the communication control apparatus using the near field wireless communication can have the above-mentioned merits, it leaves a problem that a malicious third party may try to access information in the portable device of a holder of the portable device without being noticed. For example, in the case that a person puts the Contact-Less IC card in a pocket and gets on a train, it is sufficiently possible that a malicious third party hides an IC card reader/writer, approaches the person and tries an illegal access to the Contact-Less IC card in the pocket.

As a measure to this kind of illegal access, a method can be considered wherein it detects an action that the above-mentioned holder of the portable device places the portable device over the external device, and thereby it judges a presence of intention to use of the holder's portable device.

A technology of realizing the above-mentioned method is disclosed in the patent document 1. The IC card with an illegal access prevention function disclosed in the patent document 1 has sensor means, movement information measuring means and movement model comparing means. The sensor means measures a motion. The movement information measuring means acquires movement information of the IC card with illegal access prevention function by a measured value of the sensor means. The movement model comparing means compares the movement information with a predefined movement model.

Then, the IC card with an illegal access prevention function disclosed in the patent document 1 judges whether or not the holder of the IC card with illegal access prevention function has an intention to use the IC card based on the comparison result. Further, the IC card with illegal access prevention function sets its state of whether or not it enables the communication based on the judgment.

The patent document 2 disclosed a RFID (Radio Frequency IDentification) tag distance measuring system which measures a distance from the card reader to the RFID tag using a communication function with the RFID tag.

The patent document 3 disclosed a tag communication apparatus which executes wireless communication with a RFID tag, and a position measuring unit which calculates a distance from the tag communication apparatus to the RFID tag.

The patent document 4 disclosed a method where a reader emits a near field status signal using such as a magnetic signal, an optical signal and an acoustic signal, and a transponder enables data transmission when the near field signal is detected.

PATENT DOCUMENT

[Patent Document 1] The Japanese Patent Application Laid-Open No. 2007-079665
[Patent Document 2] The Japanese Patent Application Laid-Open No. 2007-292744
[Patent Document 3] The Japanese Patent Application Laid-Open No. 2008-153715
[Patent Document 4] The Japanese Patent Application Laid-Open No. 2008-502981

SUMMARY OF THE INVENTION

Problem to be Solved by the Invention

However, for the technology disclosed in the above-mentioned patent documents, in the case that the communication control apparatus which is built-in the portable device determined whether or not it enables the communication after detecting a communication request from the external device, it had the following problem. The problem is that, it is difficult to judge with high accuracy whether or not the holder of the portable device with built-in communication control apparatus has an intention to use the portable device to the communication request.

The reason why it is difficult to judge the holder's intention with high accuracy is because; an action of placing the Contact-Less IC card over the IC card reader/writer is different for each holder. In addition, even in the case of the same user, a process of placing may change in various ways due to user's psychological and physical status and a circumstance such as a location of IC card reader/writer.

Accordingly, the accuracy is low in the case that only typical movement models are included for the comparison of the movement models. In contrast, it is difficult to arrange the movement models assuming entire situation in order to improve the accuracy.

The object of the present invention is to provide a communication control apparatus, a communication control method and a program which settle the above-mentioned problems.

Means for Solving a Problem

A communication control apparatus of the present invention includes distance measuring unit which measures a spatial distance to an arbitrary object which exists within a specific range of distance and in an adjacent position, condition memorizing unit which stores a predefined distance condition and communication unit which goes into a communication-enabled state depending on a comparison result between a value of the spatial distance and the distance condition.

A communication control method according to the present invention, for the communication device comprising storage means and communication means, measures a spatial distance to an arbitrary object which exists within a specific range of distance and in an adjacent position and changes the communication means to a communication-enabled state depending on a comparison result between a value of the spatial distance and a predefined distance condition which is memorized in the storage means.

A non-transitory computer-readable recording medium which records a program, executing with a computer which stores a predetermined distance condition for executing a process in that measuring a spatial distance to an arbitrary object which exists within a specific range of distance and in an adjacent position, and setting a communication in a enabled state depending on a comparison result of a value of the spatial distance with a predefined distance condition which is stored in the storage means.

A communication control apparatus includes distance measuring means for measuring a spatial distance to an arbitrary object which exists within a specific range of distance and in an adjacent position, condition memorizing means for storing a predefined distance condition, and communication means for going into the communication-enabled state depending on a comparison result between a value of the spatial distance and the distance condition.

Effect of the Invention

According to the present invention, in the case that the communication control apparatus determines whether or not it enables the communication for the communication request from the external device, the communication control apparatus can judge with high accuracy whether or not the holder of the portable device with built-in communication control apparatus has an intention to use the portable device to the communication request.

EXEMPLARY EMBODIMENTS FOR CARRYING OUT OF THE INVENTION

Then, exemplary embodiments for carrying out the present invention will be described in detail by referring to the figures.

First Exemplary Embodiment

Figure 1:
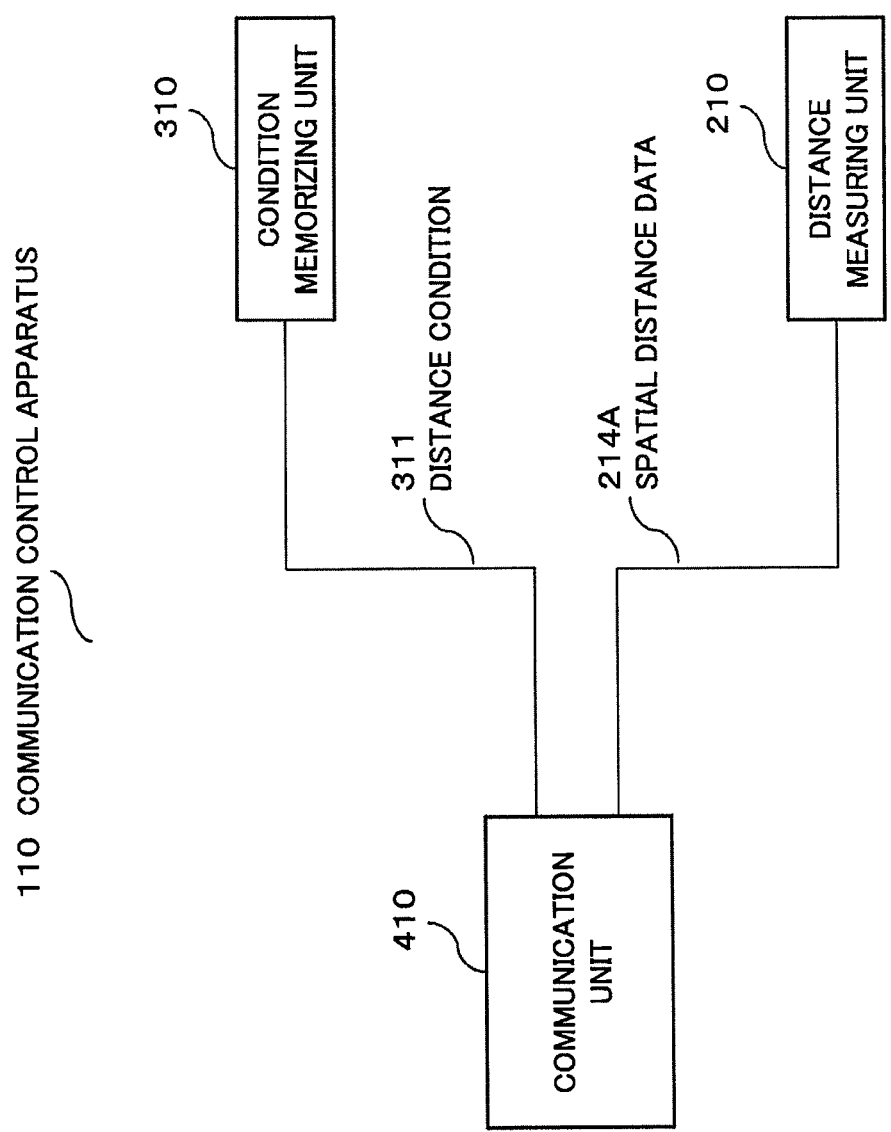
FIG. 1 is a block diagram showing a configuration according to a first exemplary embodiment of the present invention.

FIG. 1 is the block diagram showing the configuration of a communication control apparatus 110 according to the first exemplary embodiment of the present invention.

Referring to FIG. 1, the communication control apparatus 110 includes a distance measuring unit 210, a condition memorizing unit 310 and a communication unit 410.

The distance measuring unit 210 measures a spatial distance 214 (refer to FIG. 5, and a detailed description will be provided later) to an arbitrary object (not shown in the figure) which satisfies a specific range of direction and a specific range of distance and exists in an adjacent position to the distance measuring unit 210 itself. Concretely, the specific range of distance is a predefined range of direction and a predefined range of distance from the distance measuring unit 210.

Here, it will describe a concept of the predefined range of direction (hereinafter denoted as a range of monitoring direction 212) and the predefined range of distance (hereinafter denoted as a range of monitoring distance 213), from the distance measuring unit 210 with reference to FIG. 2 and FIG. 3.

Figure 2:
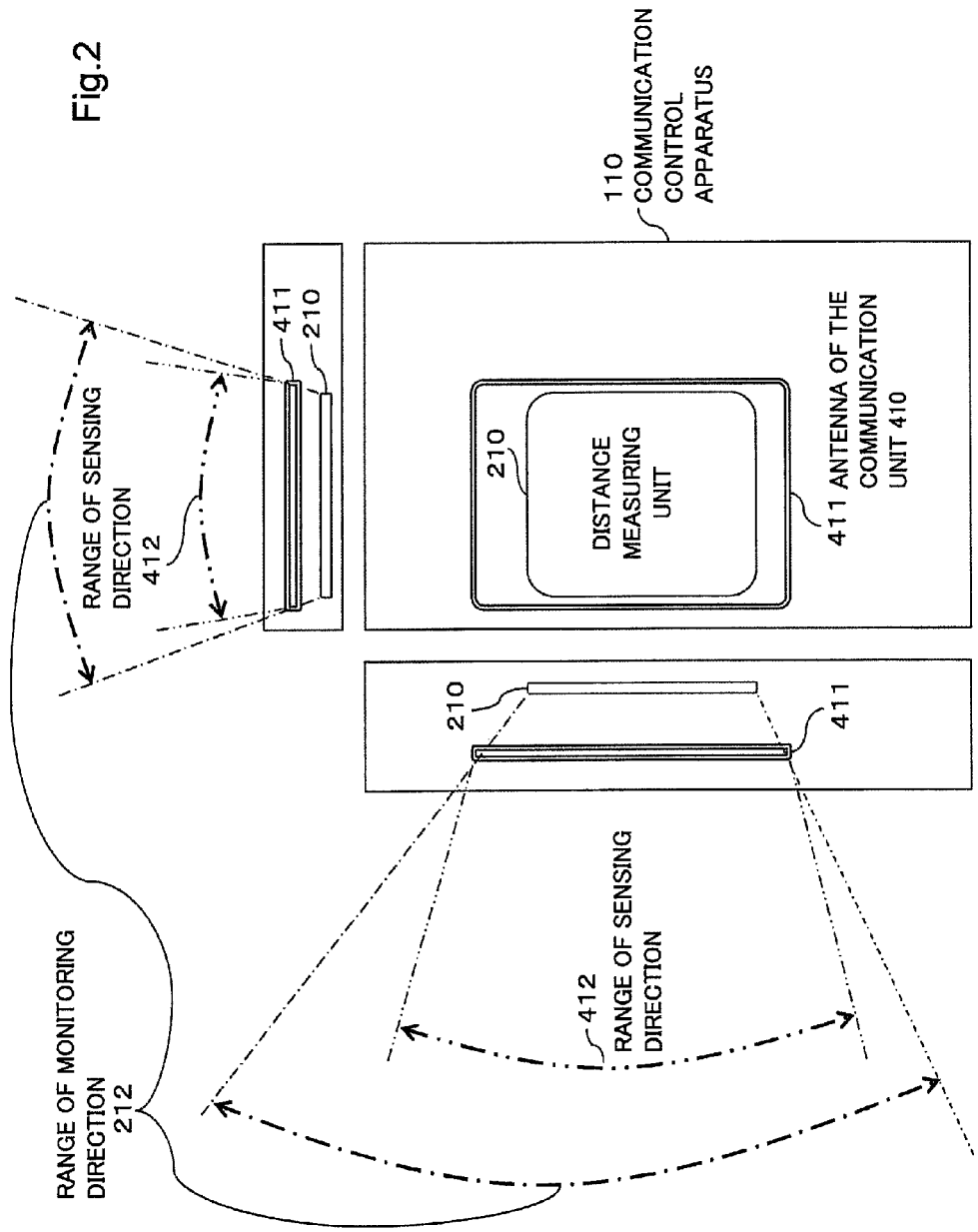
FIG. 2 is a figure showing a related image of a range of monitoring direction and a range of sensing direction based on a trihedral figure of the communication control apparatus according to a first to a fourth exemplary embodiments of the present invention.

Referring to FIG. 2, the range of monitoring direction 212 is a range including the range of direction (hereinafter denoted as a range of sensing direction 412) which an antenna 411 of the communication unit 410 (not shown in FIG. 2 or FIG. 3) has a sensitivity. Where, the range of monitoring direction 212 is wider than at least the range of sensing direction 412.

Figure 3:
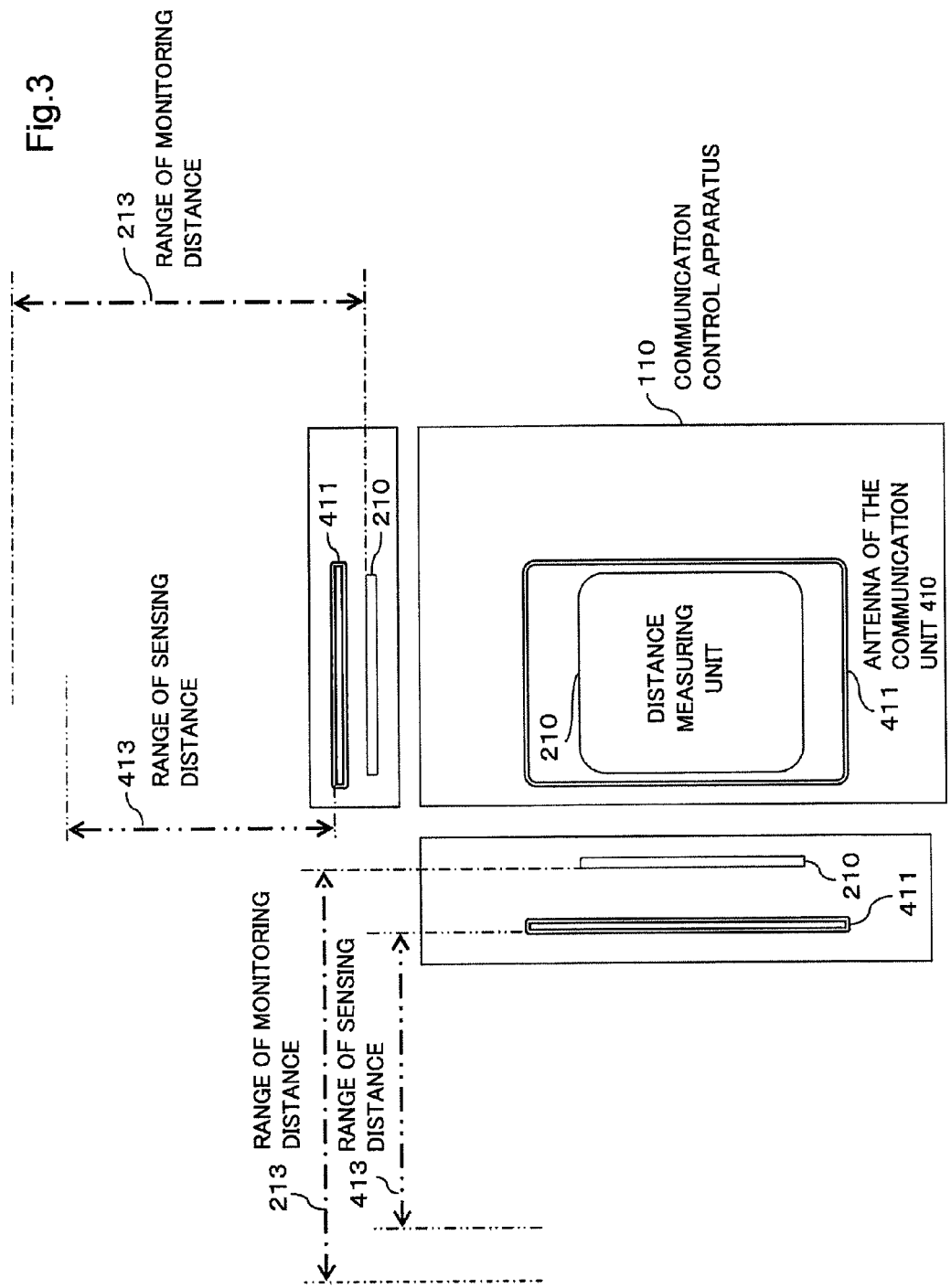
FIG. 3 is a figure showing a related image of a range of monitoring distance and a range of sensing distance based on a trihedral figure of the communication control apparatus according to the first to the fourth exemplary embodiments of the present invention.

Referring to FIG. 3, the range of monitoring distance 213 is a range including the range of distance (hereinafter denoted as a range of sensing distance 413) which the antenna 411 of the communication unit 410 (not shown in FIG. 2 or FIG. 3) has a sensitivity. Where, the range of monitoring distance 213 is wider than at least the range of sensing distance 413.

For example, the distance measuring unit 210 is an electrostatic capacity type proximity sensor. Alternatively, the distance measuring unit 210 can be such as a standing wave radar of the patch antenna type, an ultrasonic sensor, a laser interferometer or a simplified radar.

Figure 4:
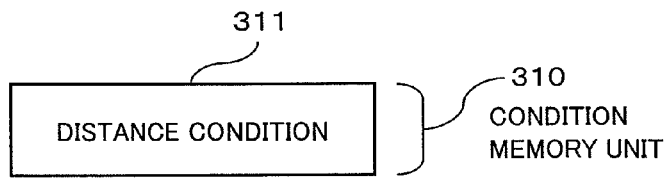
FIG. 4 is a figure showing a structure of distance condition storage means according to the first to a third exemplary embodiments of the present invention.

The condition memorizing unit 310 stores a distance condition 311 as shown in FIG. 4. The distance condition 311 is represented as a conditional expression (or a combination of conditional expressions) such as "no smaller than 15 millimeters" or "no more than 10 millimeters". The condition memorizing unit 310 is composed of such as semiconductor memories. Or, for example, the condition memorizing unit 310 can be a magnetic disk or a server which is connected via a network or the like which is not shown in the figures.

The communication unit 410 detects a communication request from the external device (external unit; not shown in the figures). In addition, the communication unit 410 goes into a communication-enabled state depending on a comparison result of a value of the spatial distance 214 which the distance measuring unit 210 measured and the distance condition 311 stored in the condition memorizing unit 310. In the communication-enabled state, the communication unit 410 communicates with the external device to sends/receives the information.

The communication unit 410 is composed of, for example, semiconductor circuits, or may be realized by a processor and a program which is executed by the processor. The communication unit 410 executes the wireless communication, for example, over a radio. Or it may execute the wireless communication over electromagnetic wave or infrared light.

Then, an entire process according to the exemplary embodiment will be described in detail by referring to FIGS. 1 to 6.

Figure 5:
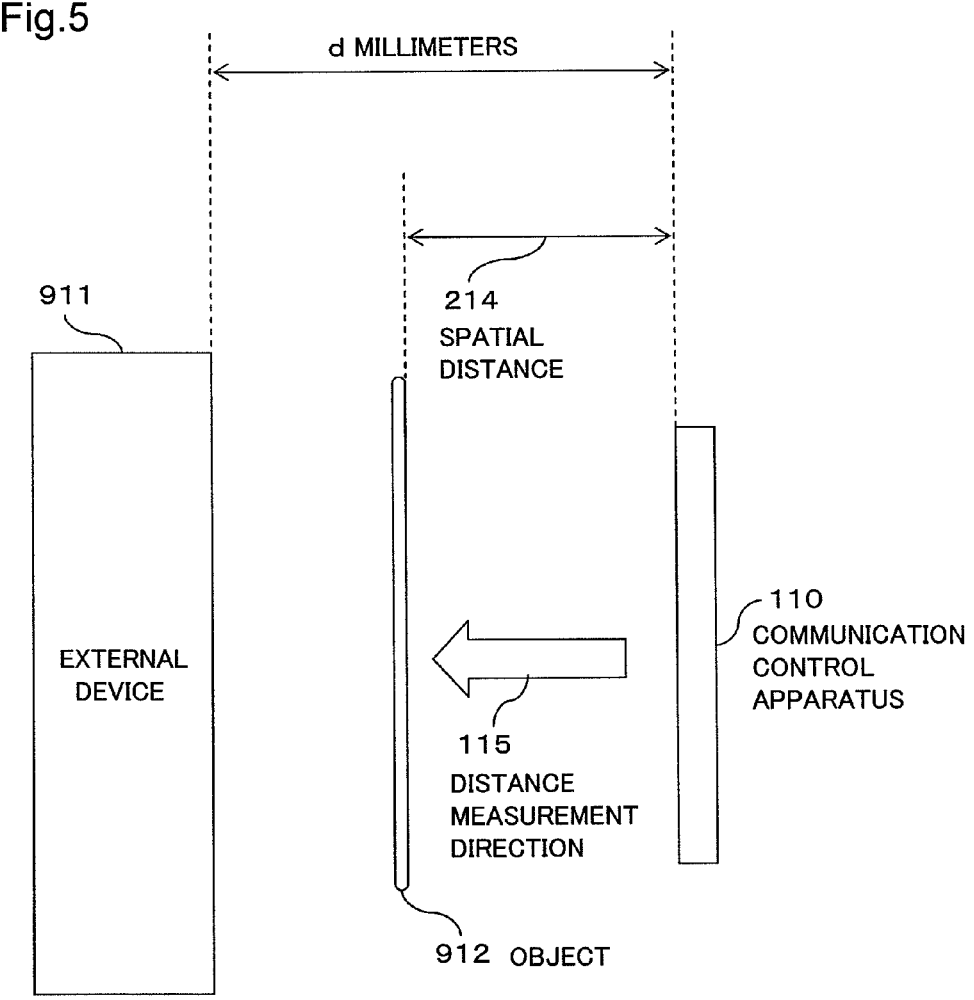
FIG. 5 is a figure showing an example of a positional relationship between the communication control apparatus, an external device and an arbitrary object according to the first to the fourth exemplary embodiments of the present invention.

FIG. 5 is the figure showing an example of an operational state according to the exemplary embodiment. In FIG. 5, it is supposed that an external device 911 and an object 912 exist within the range of sensing direction 412.

In addition, for example, it supposes that the range of sensing distance 413 and the range of monitoring distance 213 are 100 millimeters and 110 millimeters respectively. Further, for example, it supposes that the distance condition 311 stored in the condition memorizing unit 310 is "no smaller than 15 millimeters".

Where, for example, it supposes that a distance between the communication control apparatus 110 and the object 912 is equals to 9 millimeters and does not change while the processes of the following descriptions. In addition, it supposes to set that a distance between the communication control apparatus 110 and the external device 911 is "d" millimeters.

Figure 6:
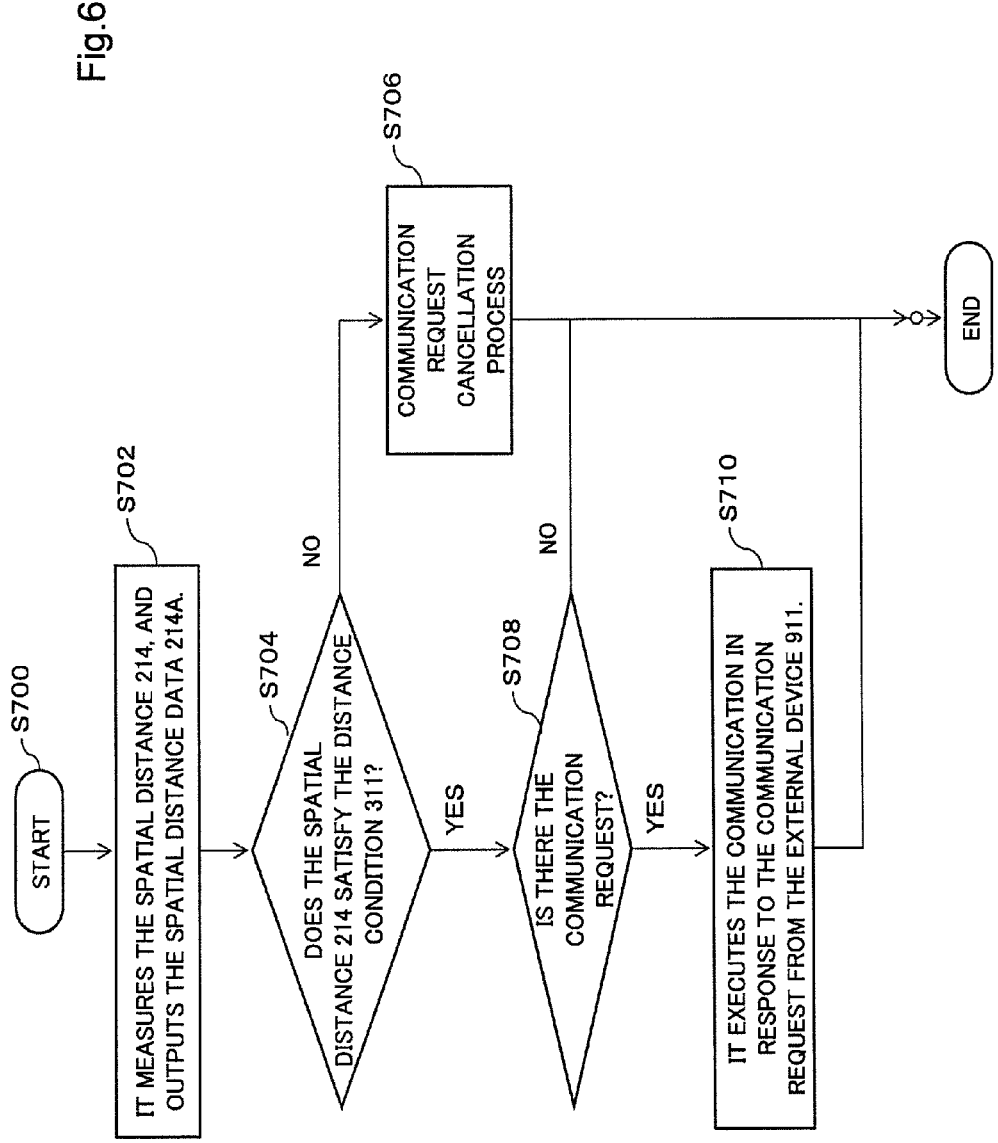
FIG. 6 is a flowchart showing processes according to the first exemplary embodiment of the present invention.

FIG. 6 is the flowchart showing the processes according to the exemplary embodiment.

According to the processes of the exemplary embodiment, the communication control apparatus 110 starts processes following to the flowchart shown in FIG. 6 by a trigger of an instruction (e.g. interruption which occurs in every predefined time (e.g. 3 seconds) by the interval timer or the like) from process starting means which is not illustrated (Step S700).

First, the distance measuring unit 210 measures the spatial distance 214 (e.g. it is measured as 9 millimeters) and outputs a spatial distance data 214A equals to 9 millimeters (Step S702).

Then, the communication unit 410 receives the spatial distance data 214A equals to "d" millimeters of Step S702, and compares the spatial distance data 214A with the distance condition 311; equals to "no smaller than 15 millimeters" which is stored in the condition memorizing unit 310 (Step S704). Then, in the case that the spatial distance 214 does not satisfy the distance condition 311 (NO in Step S704), the process advances to Step S706. Alternatively, in the case that the spatial distance 214 satisfies the distance condition 311 (YES in Step S704), the process advances to Step S708.

In the case of the operational state which is shown in FIG. 5 as an example of the distance condition 311 and the value of the spatial distance 214, the process advances to Step S706, because the spatial distance 214 does not satisfy the distance condition 311.

In Step S706, the communication unit 410 executes a cancellation of the communication request coming from the external device 911 (Step S706). Alternatively, the communication unit 410 may reply an explicit refusal of communication to the external device 911 and abort the communication. Alternatively, the communication unit 410 may indicate a warning and abort the communication.

Then, in FIG. 5, processes at a state where the object 912 does not exist will be described.

First, the distance measuring unit 210 measures the spatial distance 214 (e.g. in case of FIG. 5, it is measured as "d" millimeters) and outputs the spatial distance data 214A (Step S702).

Then, the communication unit 410 receives the spatial distance data 214A equals to "d" millimeters in Step S702, and compares the spatial distance data 214A with the distance condition 311; "no smaller than 15 millimeters" which is stored in the condition memorizing unit 310 (Step S704). Then, in the case that the spatial distance 214 does not satisfy the distance condition 311 (NO in Step S704), the process advances to Step S706. Alternatively, in the case that the spatial distance 214 satisfies the distance condition 311 (YES in Step S704), the process advances to Step S708.

Here, for example, if it supposes that d=30 (i.e. the spatial distance data 214A equals to 30 millimeters), the process advances to Step S708 because the spatial distance 214 satisfies the distance condition 311.

In Step 708, the communication unit 410 checks whether there is a communication request from the external device 911 (Step S708). If there is no communication request (NO in Step S708), it finishes the process. Or if the communication request exists (YES in Step S708), then the process advances to Step 710.

In the state of the current description, because the spatial distance 214 which is equal to 30 millimeters is within the range of the range of sensing distance 413 which is equal to 100 millimeters, the communication unit 410 detects the communication request from the external device 911, and determines that there is the communication request.

In Step 710, the communication unit 410 shifts to the communication-enabled and executes the communication in response to the communication request from the external device 911 (Step S710). Where, in the case that the communication which is initiated in Step S710 has completed, it finishes the process.

An effect according to the above-mentioned exemplary embodiment includes a point that, in the case that it determines whether or not to enable the communication for the communication control apparatus 110 to the communication request from the external device 911, it can judge with high accuracy whether or not a holder of the portable device with built-in communications control device 110 (not shown in the figures) has an intention to use the portable device for the communication request.

The reason is because; after the distance measuring unit 210 measures the spatial distance 214 to the adjoining arbitrary object 912, the communication unit 410 determines the communication-state enabled/disabled depending on whether or not the spatial distance 214 satisfies the distance condition 311.

That is, the above-mentioned communication control apparatus 110 can judge within a short period of time and with high accuracy a behavior of a user who places the communication control apparatus 110 which is built-in the portable device over the external device 911, without using movement information as the index of the portable device itself which is difficult to measure. Further, the portable device can prevent an illegal access to itself by controlling the communication function of the communication control apparatus 110 based on the judgment.

Second Exemplary Embodiment

Then, the second exemplary embodiment for carrying out the present invention will be described in detail by referring to the figures. Where, it skips contents which are overlapping with the above-mentioned descriptions as far as the contents of the description according to the following second exemplary embodiment may not become inaccurate.

Figure 7:
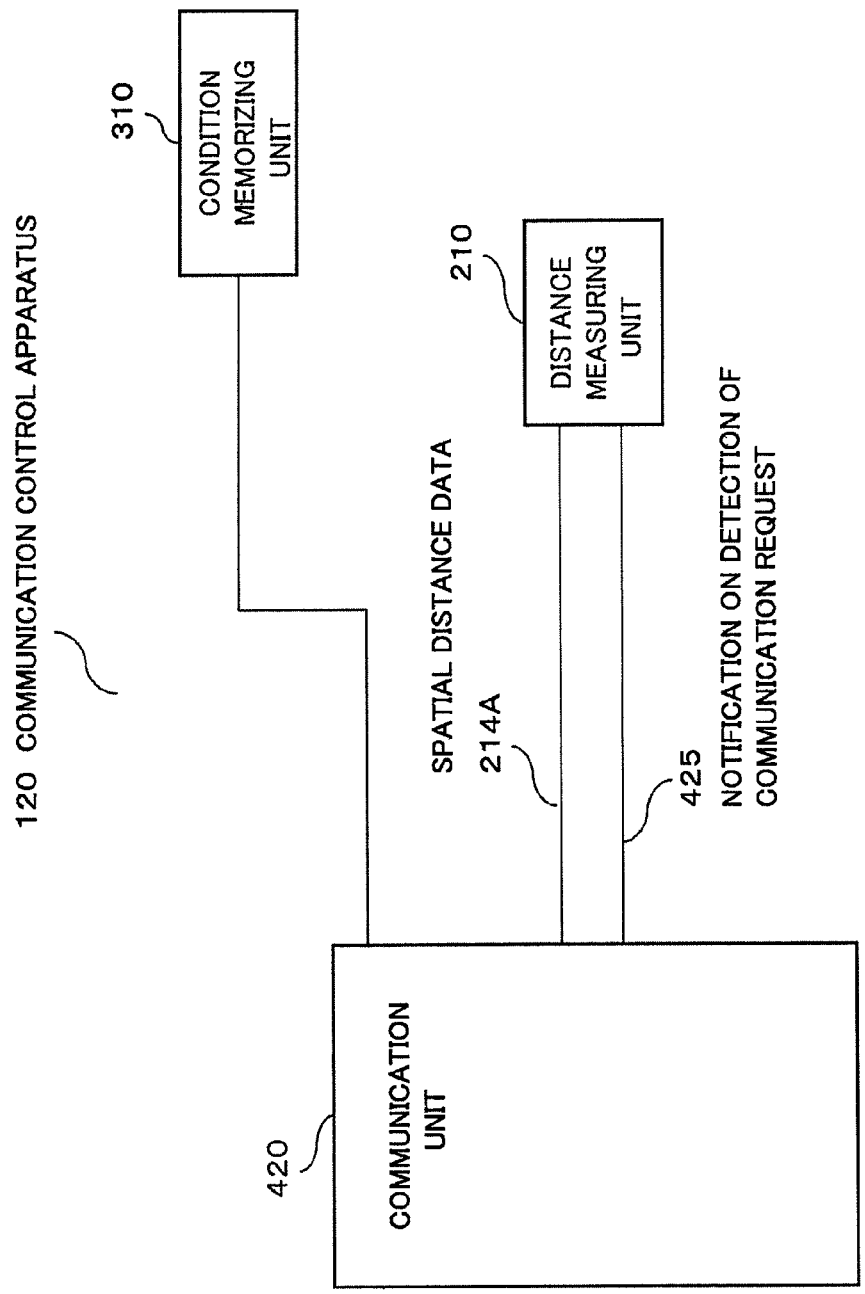
FIG. 7 is a block diagram showing a configuration according to a second exemplary embodiment of the present invention.

FIG. 7 is the block diagram showing the configuration of a communication control apparatus 120 according to the second exemplary embodiment of the present invention.

Referring to FIG. 7, in the configuration according to the second exemplary embodiment compared with the first exemplary embodiment, the communication unit 410 is replaced with a communication unit 420.

The communication unit 420 detects the communication request from the external device 911 and outputs a notification on detection of communication request 425.

Then, it will describe in detail the processes according to the exemplary embodiment by referring to FIGS. 2 to 5 and FIGS. 7 to 8.

Figure 8:
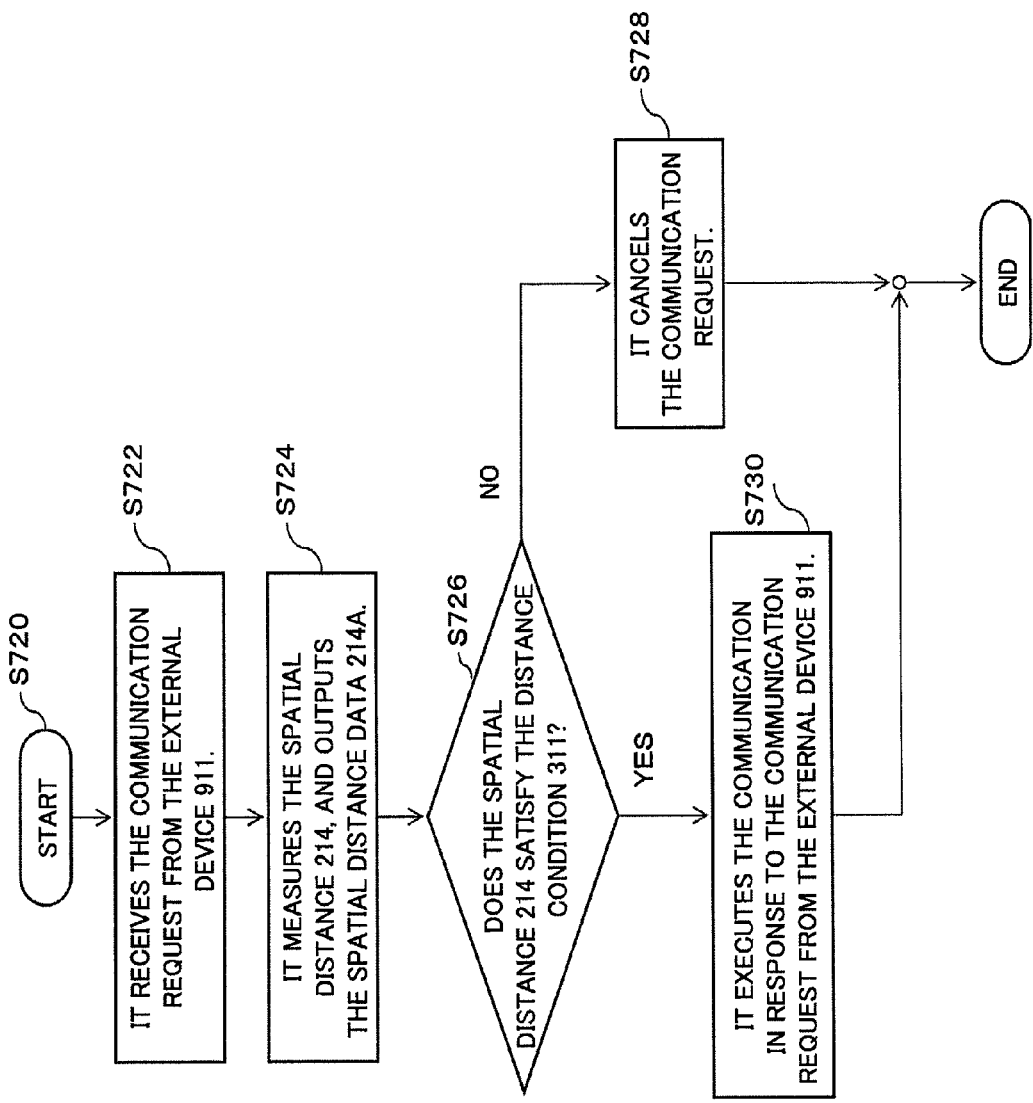
FIG. 8 is a flowchart showing processes according to the second exemplary embodiment of the present invention.

FIG. 8 is the flowchart showing the processes according to the exemplary embodiment.

The communication control apparatus 120 starts the processes of the flowchart shown in FIG. 8 by a trigger that the external device 911 enters within the range of monitoring direction 212 and within the range of monitoring distance 213 which is equal to 110 millimeters (e.g. d<110) (S720).

First, the communication unit 420 receives the communication request from the external device 911 and outputs the notification on detection of communication request 425 to the distance measuring unit 210 (S722).

Then, the distance measuring unit 210 which received the notification on detection of communication request 425 measures the spatial distance 214 (e.g. it is measured as 9 millimeters), and outputs the spatial distance data 214A which is equal to 9 millimeters (Step S724).

Then, the communication unit 420 receives the spatial distance data 214A which is equal to 9 millimeters of Step S724, and compares the spatial distance data 214A with the distance condition 311 (e.g. no smaller than 15 millimeters) which is stored in the condition memorizing unit 310 (Step S726).

In the case of the operational state is shown in FIG. 5 as an example of the distance condition 311 and the value of the spatial distance 214, the process advances to Step S728 because the spatial distance 214 does not satisfy the distance condition 311. In addition, in FIG. 5, in the case that the object 912 does not exist and the spatial distance 214 satisfies the distance condition 311 (YES in Step S726), the process advances to Step S730.

In Step S728, the communication unit 420 discards the communication request which is received from the external device 911 (Step S728). Alternatively, the communication unit 420 may return a reply indicating that the communication is explicitly rejected to the external device 911, and abort the communication. Alternatively, the communication unit 420 may execute a warning indication and abort the communication.

In Step S730, the communication unit 420 goes into the communication-enabled state, responds to the communication request of the external device 911 and starts the communication with the external device 911 (Step S730).

Where, in the case that the communication which is started in Step S730 has completed, it finishes the processes.

An effect according to the above-mentioned exemplary embodiment includes a point that, it can reduce power consumption of the communication control apparatus 120, in addition to the effect of the first exemplary embodiment.

The reason is because; it is designed so as the communication control apparatus 120 measures the spatial distance 214 in the case that it receives the communication request from the external device 911.

Third Exemplary Embodiment

Then, the third exemplary embodiment for carrying out the present invention will be described in detail by referring to the figures. Where, it skips contents which are overlapping with the above-mentioned descriptions as far as the contents of the description according to the following third exemplary embodiment may not become inaccurate.

Figure 9:
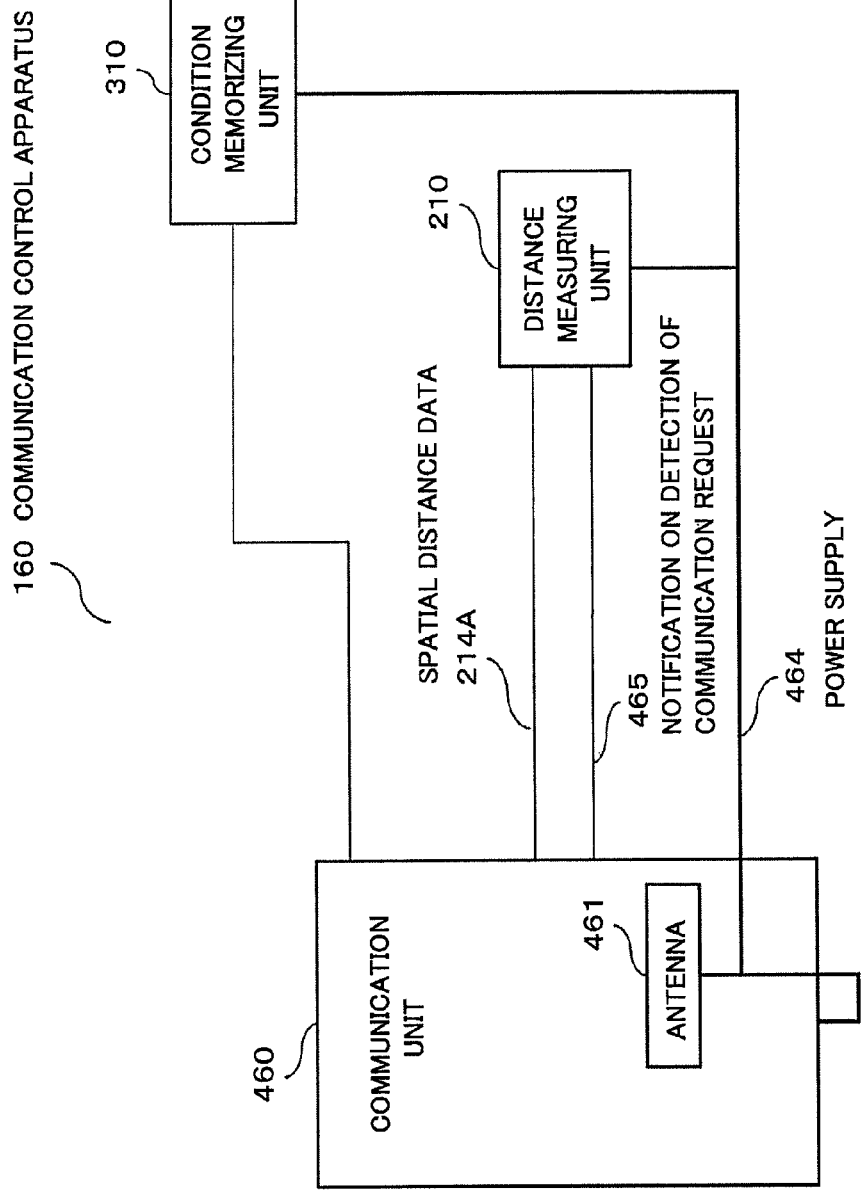
FIG. 9 is a block diagram showing a configuration according to the third exemplary embodiment of the present invention.

FIG. 9 is the block diagram showing the configuration of a communication control apparatus 160 according to the third exemplary embodiment of the present invention.

Referring to FIG. 9, in the configuration according to the third exemplary embodiment compared with the second exemplary embodiment, the communication unit 420 is replaced with a communication unit 460 and the antenna 411 is replaced with an antenna 461.

The communication unit 460 detects the communication request from the external device 911, and outputs a notification on detection of communication request 465. In addition, the antenna 461 of the communication unit 460 acquires communication energy from the external device 911, and supplies electric power 464 to the distance measuring unit 210, the condition memorizing unit 310 and the communication unit 460.

Then, processes according to the exemplary embodiment will be described in detail by referring to FIGS. 2 to 5 and FIGS. 7 to 10.

Figure 10:
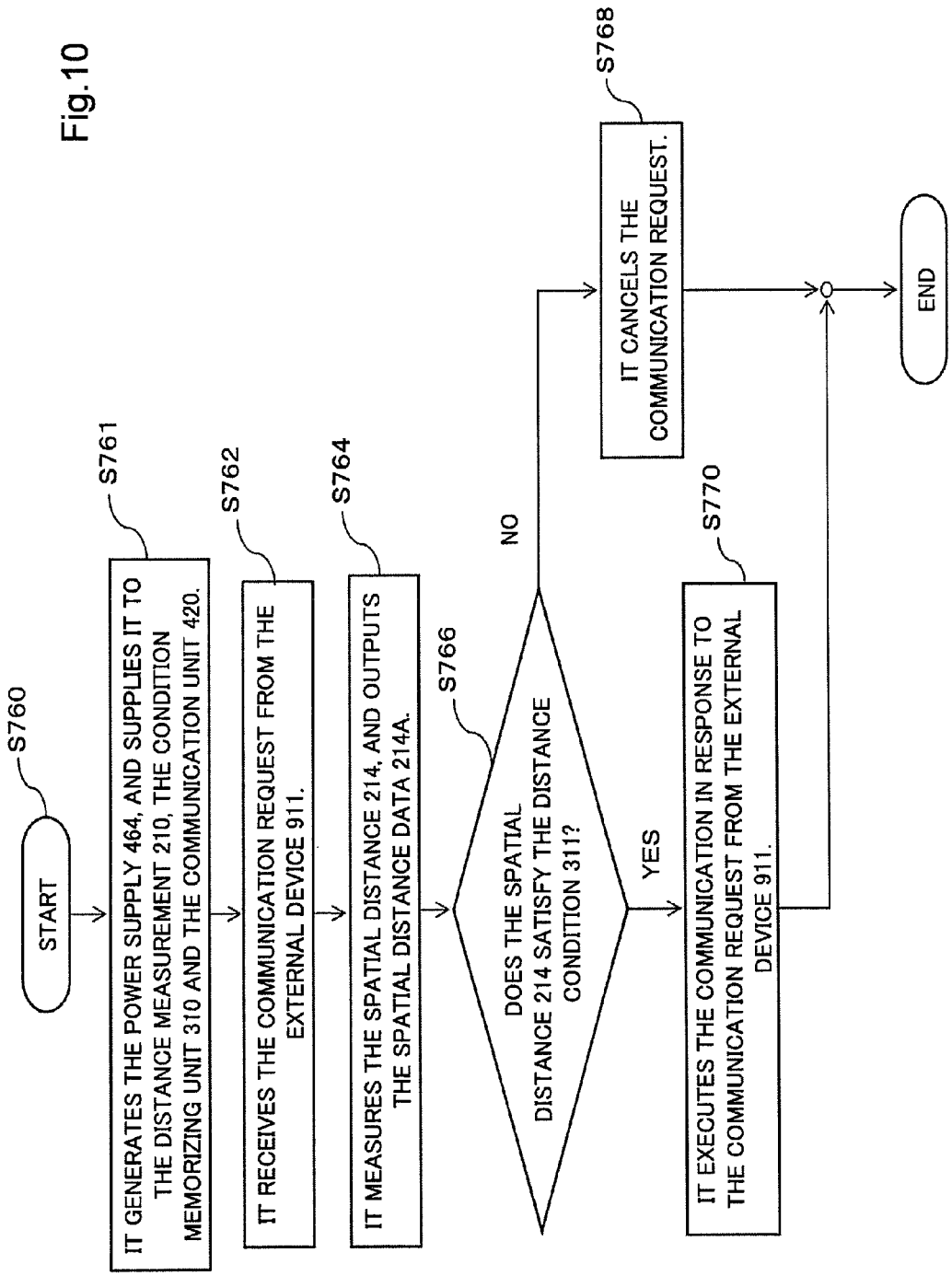
FIG. 10 is a flowchart showing processes according to the third exemplary embodiment of the present invention.

FIG. 10 is the flowchart showing the processes according to the exemplary embodiment.

The communication control apparatus 160 starts the processes of the flowchart shown in FIG. 8 by a trigger that the external device 911 enters within the range of monitoring direction 212 and within the range of monitoring distance 213 which is equal to 110 millimeters (e.g. d<110) (S760).

First, the antenna 461 of the communication unit 460 generates the electric power 464 by the electromagnetic energy received in accordance with transmission of the communication request from the external device 911, and supplies the electric power 464 to the distance measuring unit 210, the condition memorizing unit 310 and the communication unit 420 (S761).

Then, the communication unit 460 receives the communication request from the external device 911 via the antenna 461 and outputs the notification on detection of communication request 465 to the distance measuring unit 210 (S762).

Hereinafter, because each process of Steps S764 to S770 in FIG. 10 is identical with the respective process of Steps S724 to S730 in FIG. 8 described in the second embodiment, it skips the descriptions.

An effect according to the above-mentioned exemplary embodiment is a point that, it does not have to equip an electric power unit such as batteries in the communication control apparatus 160, in addition to the effect of the second exemplary embodiment.

Hereinafter, it will describe by citing a detailed example.

In the pertinent art disclosed in the patent document 1, in order to calculate movement information on the portable device itself from primary information obtained by an acceleration sensor or a speed sensor, it needs to repeatedly execute numerical integrations. In order to do that, it needs to accumulate a certain amount of measured value and needs measuring time for that.

Therefore, in the case that there is an access request from the external device to the communication control apparatus which is built-in the portable device, it cannot immediately judge whether or not it enables the access. In order to immediately execute the judgment on whether or not it enables the access, because it has to measure regularly such as acceleration and speed of it and to calculate the movement information based on them, amount of power consumption becomes large.

Further, in general, in the case that it calculates the movement information by the acceleration and the speed, accumulated amount of errors tends to become large. Accordingly, in order to get practical movement information, mounted acceleration sensors and speed sensors are tend to be expensive and large.

However, according to the exemplary embodiment, the communication control apparatus 160 should execute the above-mentioned distance measurement at a moment when there is an access request from the external device 911. In addition, because driving electric power is supplied at this moment to the communication control apparatus 160 through the emitted electromagnetic field from the external device 911, it can also get a similar effect for the portable device which does not have an electric power unit such as batteries.

Fourth Exemplary Embodiment

Then, the fourth exemplary embodiment for carrying out the present invention will be described in detail by referring to the figures. Where, it skips contents which are overlapping with the above-mentioned descriptions as far as the contents of the description according to the following fourth exemplary embodiment may not become inaccurate.

Figure 11:
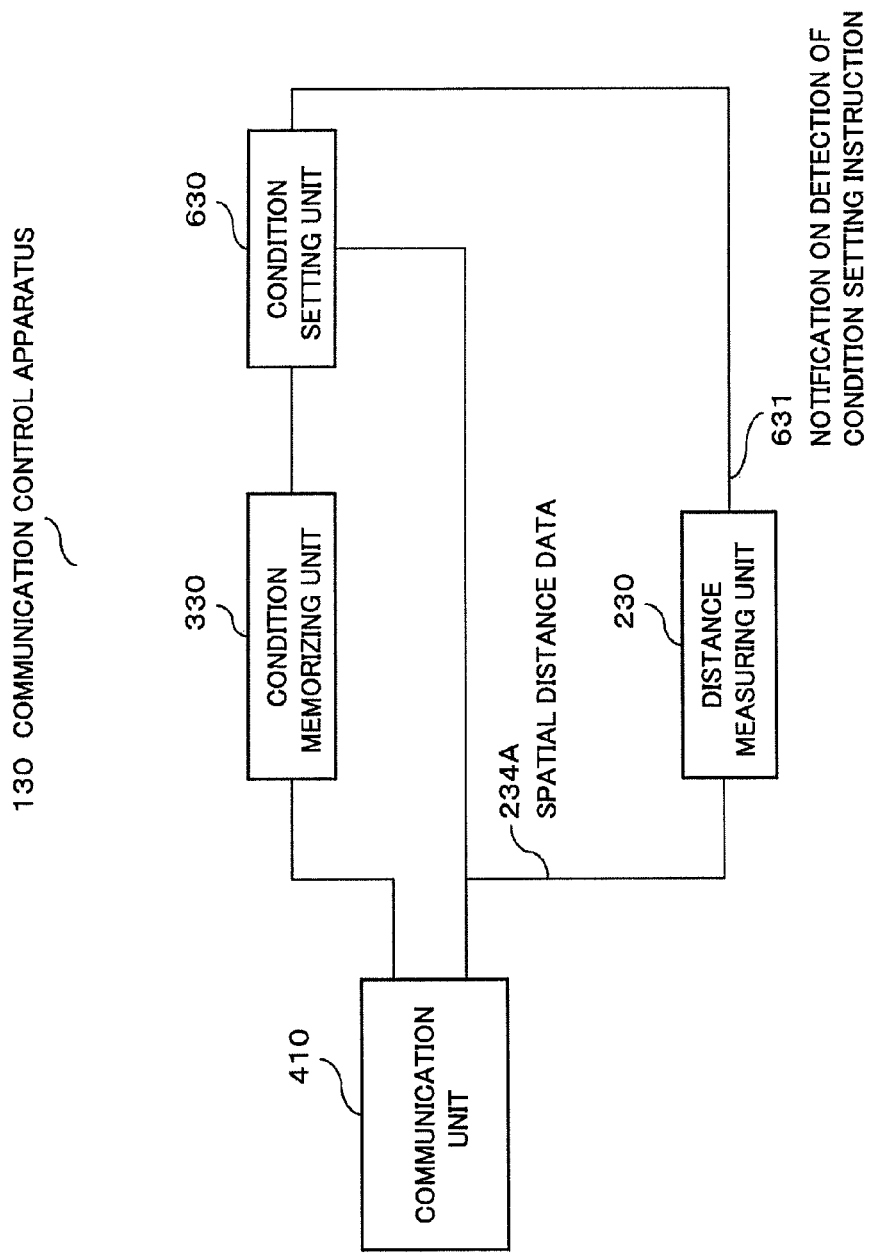
FIG. 11 is a block diagram showing a configuration according to the fourth exemplary embodiment of the present invention.

FIG. 11 is the block diagram showing the configuration of a communication control apparatus 130 according to the fourth exemplary embodiment of the present invention.

Referring to FIG. 11, in the configuration according to the fourth exemplary embodiment compared with the first exemplary embodiment, the distance measuring unit 210 and the condition memorizing unit 310 are replaced with a distance measuring unit 230 and a condition memorizing unit 330 respectively, and a condition setting unit 630 is additionally included.

Figure 12:
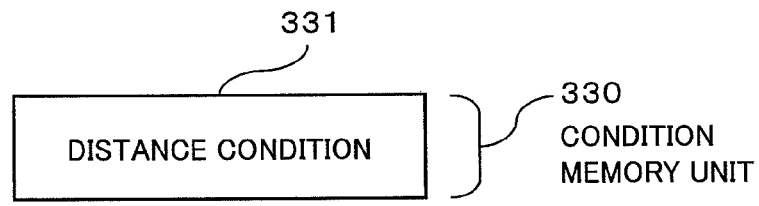
FIG. 12 is a figure showing a structure of distance condition storage means according to the fourth exemplary embodiment of the present invention.

The condition memorizing unit 330 stores a distance condition 331 which is shown in FIG. 12.

In the case that the condition setting unit 630 receives the condition setting instruction from means which is not illustrated, it creates the distance condition 331 based on the spatial distance 214 which the distance measuring unit 230 measured, and stores in the condition memorizing unit 330. Where, the means, which outputs the condition setting instruction and is not illustrated in the figures, includes such as a key switch of a mobile phone. Further, for example, it may output the condition setting instruction from the external device 911 via the communication unit 410.

Then, processes according to the exemplary embodiment will be described in detail by referring to FIGS. 11 to 13.

Figure 13:
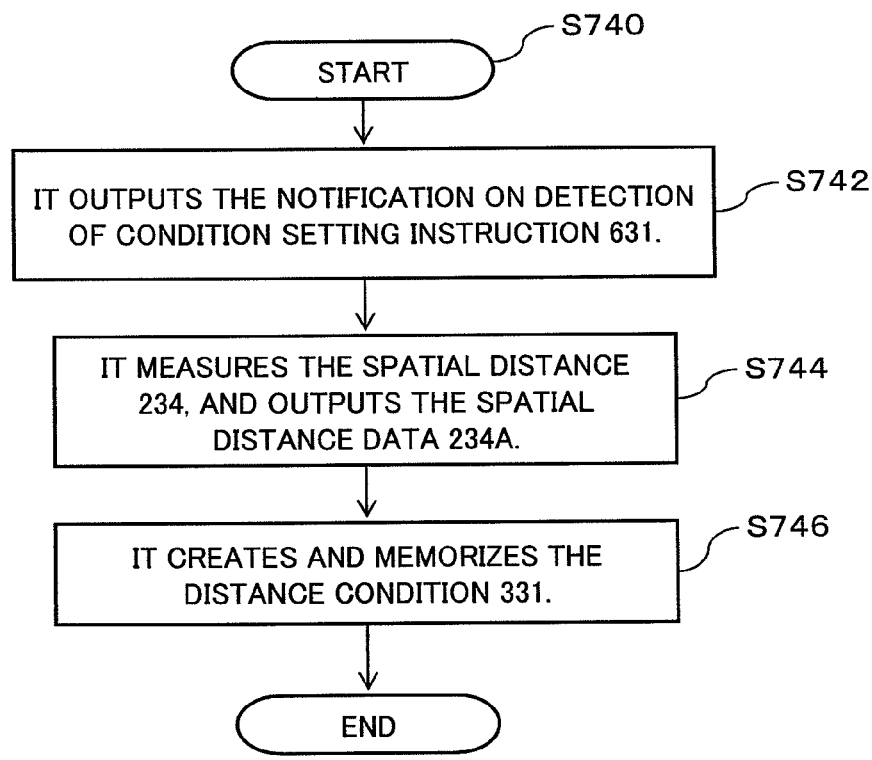
FIG. 13 is a flowchart showing processes according to the fourth exemplary embodiment of the present invention.

FIG. 13 is the flowchart showing the processes according to the exemplary embodiment.

The communication control apparatus 130 starts the processes shown in FIG. 13 by a trigger of detecting the condition setting instruction (Step S740).

First, in the case that the condition setting unit 630 receives the condition setting instruction, it outputs a notification on detection of condition setting instruction 631 (Step S742).

Then, in the case that the distance measuring unit 230 receives the notification on detection of condition setting instruction 631, it measures the spatial distance 234 to an object arranged within the range of sensing direction and within the range of sensing distance (e.g. 20 millimeters), and outputs a spatial distance data 234A (Step S744).

The condition setting unit 630 creates the distance condition 331 (e.g. not smaller than 20 millimeters) based on the spatial distance data 234A, and stores it in the condition memorizing unit 330 as shown in FIG. 12 (Step S746).

Where, even though the configuration according to the exemplary embodiment is based on the configuration according to the first exemplary embodiment and is modified, it can be based on the configuration according to the second or the third exemplary embodiment and be modified.

An effect according to the above-mentioned exemplary embodiment includes a point that, it can set easily the distance condition 331 in accordance with a personal practical life, in addition to the effect according to the first exemplary embodiment.

The reason is because; it sets the distance condition 331 based on the spatial distance 234 which is measured by the distance measuring unit 230.

Fifth Exemplary Embodiment

Then, the fifth exemplary embodiment for carrying out the present invention will be described in detail by referring to the figures. Where, it skips contents which are overlapping with the above-mentioned descriptions as far as the contents of the description according to the following fourth exemplary embodiment may not become inaccurate.

Figure 14:
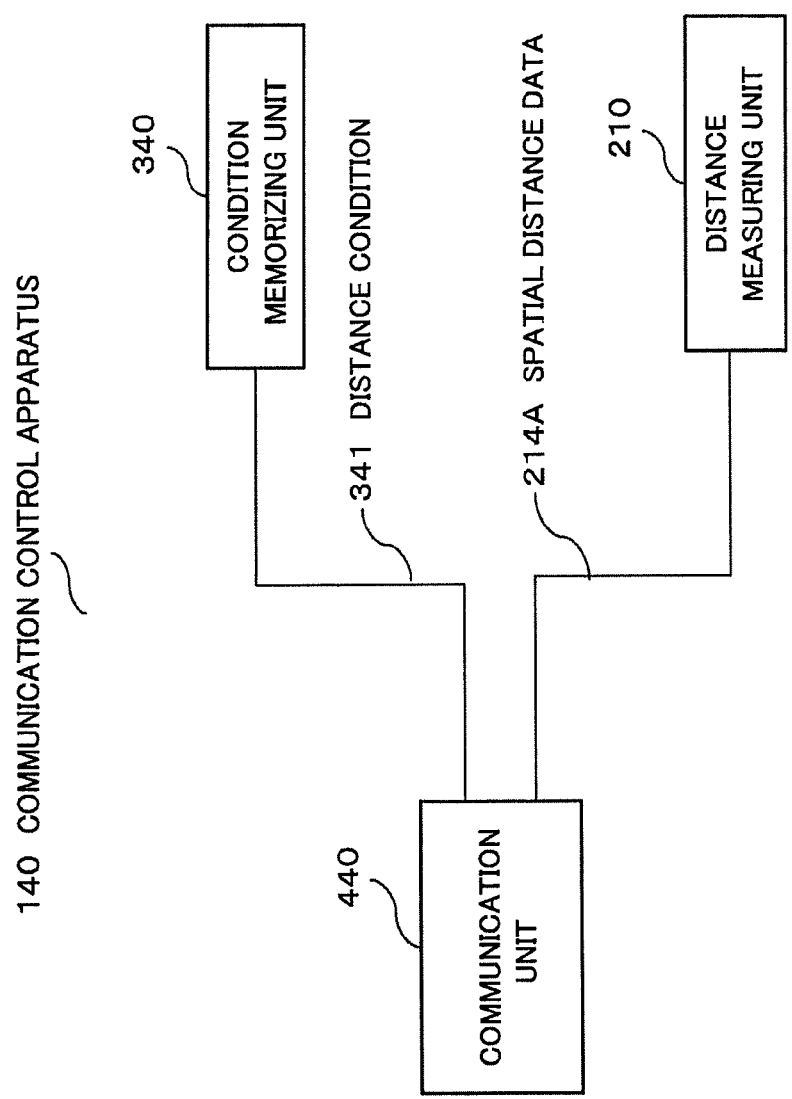
FIG. 14 is a block diagram showing a configuration according to a fifth exemplary embodiment of the present invention.

FIG. 14 is the block diagram showing the configuration of a communication control apparatus 140 according to the fifth exemplary embodiment of the present invention.

Referring to FIG. 14, in the configuration according to the fifth exemplary embodiment compared with the first exemplary embodiment, the condition memorizing unit 310 and the communication unit 410 are replaced with a condition memorizing unit 340 and a communication unit 440 respectively.

Figure 15:
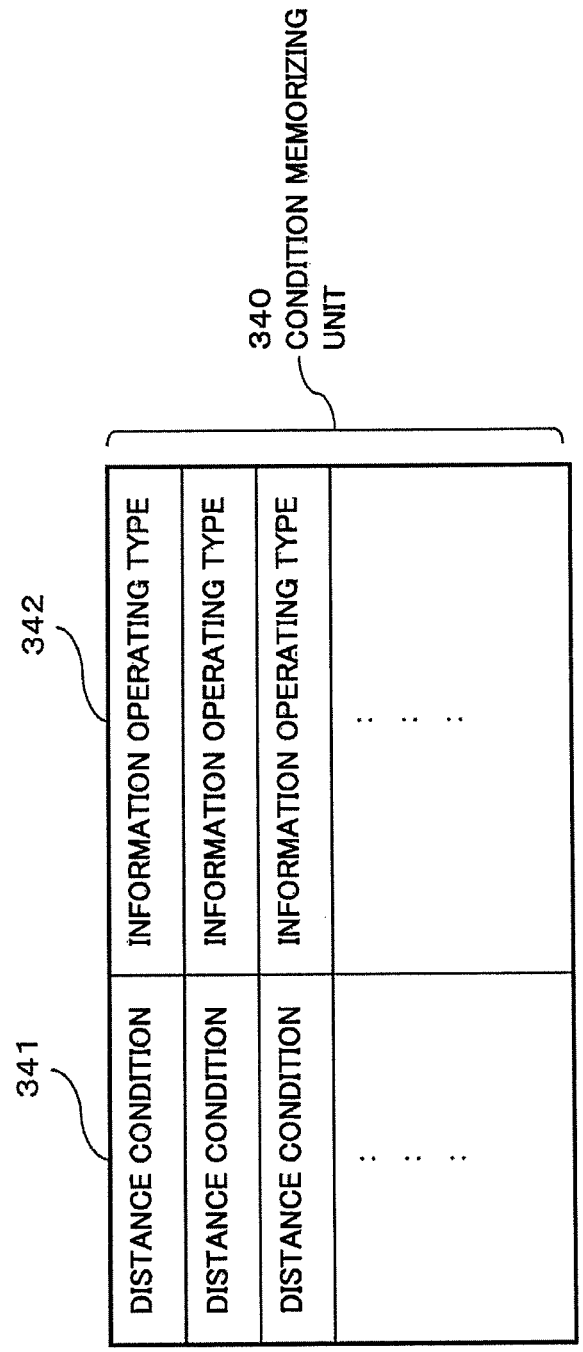
FIG. 15 is a figure showing a structure of distance condition storage means according to the fifth exemplary embodiment of the present invention.

The condition memorizing unit 340 stores a distance condition 341 and corresponding information operating type 342 as shown in FIG. 15. The distance condition 341 is similar to the distance condition 311 which is described according to the first exemplary embodiment. The information which is memorized as the information operating type 342 includes such as a reference of owner name of the portable device, and a change of charge balance. The condition memorizing unit 330 is composed of such as semiconductor memories. In addition, for example, the condition memorizing unit 330 can be a magnetic disk or a server which is connected via a network or the like which is not shown in the figures.

In the case that the communication unit 440 detects a communication request from the external device 911, it communicates with the external device 911, analyzes the request from the external device 911 and selects the information operating type 342. Then, the communication unit 440 judges whether or not it enables the communication with the external device 911 based on the comparison result between a value of the spatial distance 214 (i.e. spatial distance data 214A) which the distance measuring unit 210 measured and the distance condition 341 corresponding to the information operating type 342 which is judged among the information operating type 342 that is stored in the condition memorizing unit 340.

Then, the communication unit 440 communicates with the external device 911 and sends and receives the information based on judgment on whether or not it enables the communication.

Where, even though the configuration according to the exemplary embodiment is based on the configuration according to the first exemplary embodiment and is modified, it can be based on the configuration according to the second to the fourth exemplary embodiment and be modified.

An effect according to the above-mentioned exemplary embodiment includes a point that, it can control whether or not it enables the communication of the communication control apparatus 110 based on the information operating type, in addition to the effect according to the first exemplary embodiment.

The reason is because; it correlates the information operating type 342 and the distance condition 341, and stores them in the condition memorizing unit 340.

It will describe using a concrete example. First, for the portable device having the season pass function, it can set such as "no smaller than 0 millimeters" for the information operating type 342 of the season pass function, and such as "no smaller than 20 millimeters" for the information operating type 342 other than the season pass function. In this way, it is possible to use the season pass function of portable devices while putting the portable devices in a bag, and it can protect the information operating type 342 other than the season pass function from an illegal access.

In the descriptions of each of the above-mentioned exemplary embodiments, the portable devices and the external devices can be respectively an IC card and an IC card reader/writer, or a portable device having the IC card function and information processing systems having the IC card reader/writer function. Alternatively, the portable devices and the external devices can be respectively a RFID tag and a tag reader/writer, or a terminal having a wireless LAN functions and a wireless LAN access point.

Figure 16:
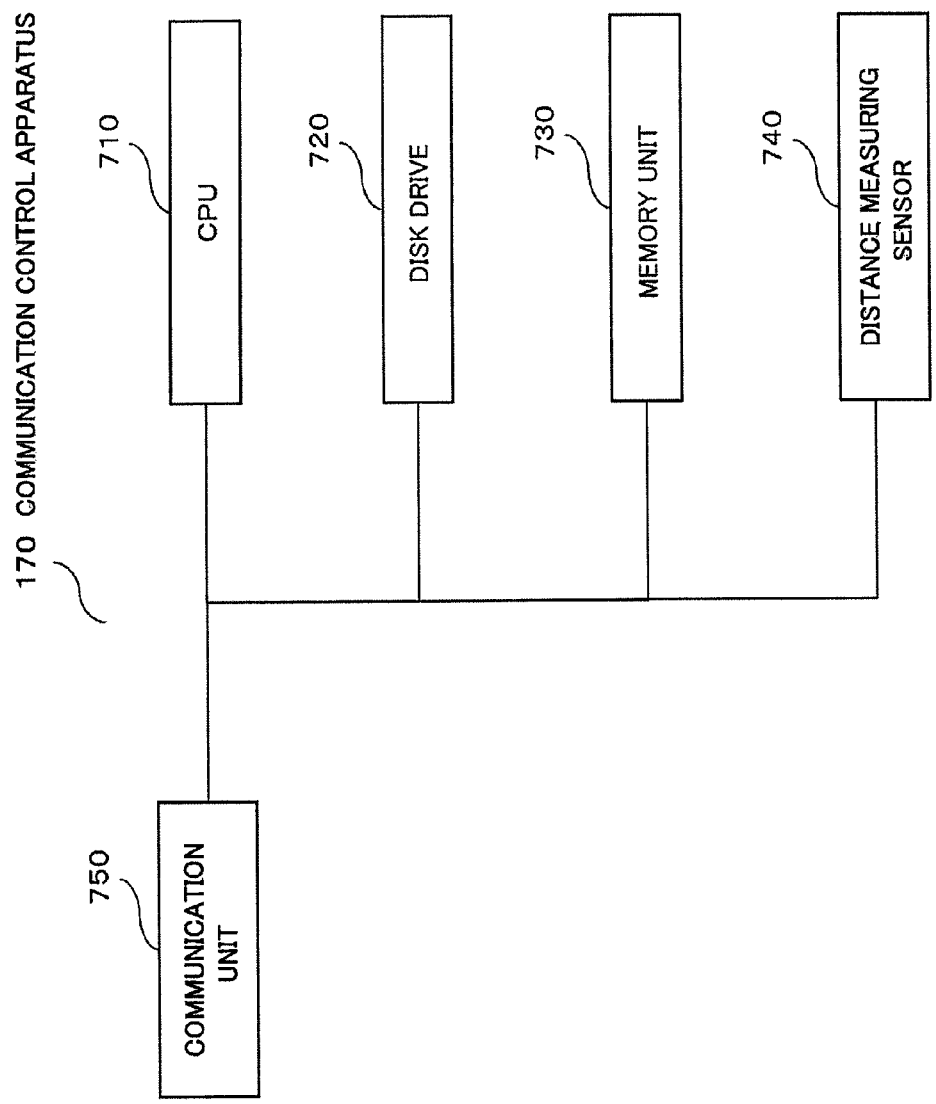
FIG. 16 is a block diagram showing the configuration of a communication control apparatus which forces the computer to execute the predefined processes by the program.
Figure 17:
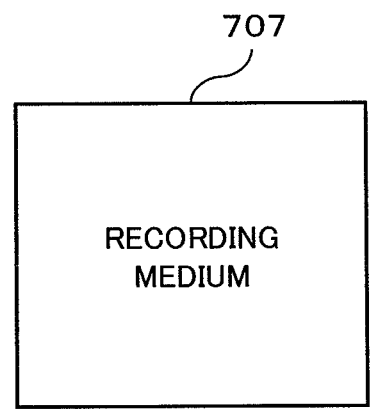
FIG. 17 is an explanatory drawing showing a non-transitory computer-readable recording medium.

Each component described in each of the above-mentioned exemplary embodiments can be executed by a computer with predefined processes by a program, as shown in FIG. 16.

FIG. 16 is the block diagram showing the configuration of a communication control apparatus 170 which forces the computer to execute the predefined processes by the program. Referring to FIG. 16, the communication control apparatus 170 includes a CPU (Central Processing Unit) 710, a disk drive 720, a memory unit 730, a distance measuring sensor 740 and a communication unit 750.

The CPU 710 extracts a program stored in the disk drive 720 into such as the memory unit 730, and executes the predefined processes based on the extracted program.

The disk drive 720 memorizes the program which enforces the computer to execute a part of the processes of the communication control apparatus in each of the above-mentioned exemplary embodiments.

The memory unit 730 stores the program and the contents of the condition memorizing unit in each of the above-mentioned exemplary embodiments.

The distance measuring sensor 740 measures the distance to the adjacent object.

The communication unit 750 is identical to the communication unit according with each of the above-mentioned exemplary embodiments.

Each component described according to each of the above-mentioned exemplary embodiments does not need to be existed independently. For example, each component can be realized by combining a plurality of components to one module, or one component is realized a plurality of modules. Moreover, each component can be configured such as a certain component is a part of a component, or a part of the component overlaps with a part of another certain component.

Further, according to the description of each of the above-mentioned exemplary embodiments, although a plurality of processes are sequentially described in the form of the flow-charts, order of the descriptions does not limit to order of executing a plurality of processes. For this reason, in the case that it implements each of the above-mentioned exemplary embodiments, it can modify the order of a plurality of processes within a scope of not to hinder the contents.

Moreover, according to the descriptions of each of the above-mentioned exemplary embodiments, each of a plurality of processes is not limited to be executed at a different timing. For example, other processes may start an execution during an execution of a certain process, or each of execution timing of the processes may partial or completely overlaps with other processes.

Moreover, according to the description of each of the above-mentioned exemplary embodiments, even though it is described that a certain process will be a trigger of other processes, the description does not limit to entire relations of a certain process with other processes. For this reason, in the case that it implements each of the exemplary embodiments, it can change the relation among a plurality of processes within a scope of not to hinder the contents. In addition, the description in detail of each process of each component does not limit to each process of each component. For this reason, in the case that it implements each of the exemplary embodiments, details of each process of each component can be changed within a scope of not to hinder functional, performance and other characteristics.

Where, according to needs, if it will be possible based on needs, each component according to the description of each of the above-mentioned exemplary embodiments can be realized by hardware, software or a mixture of the hardware and the software.

In addition, a physical configuration of each component is not limited to the descriptions according to the above-mentioned exemplary embodiments, and it can be existed independently, existed after a combination, or constituted separately.

While this invention has been particularly shown and described with reference to exemplary embodiments thereof, the invention is not limited to those specific exemplary embodiments. It will be understood by those of ordinary skill in the art that various changes in form and details may be made therein without departing from the spirit and scope of the present invention.

This application is based upon and claims the benefit of priority from Japanese Patent Application No. 2009-273637, filed on Dec. 1, 2009, the disclosure of which is incorporated herein in its entirety by reference.

INDUSTRIAL APPLICABILITY

The present invention can be applied to various applications including a portable information terminal having a Contact-Less IC card and a communication function similar to the Contact-Less IC card and a system using these arts.

DESCRIPTION OF THE REFERENCE NUMERALS 110 communication control apparatus
120 communication control apparatus
130 communication control apparatus
140 communication control apparatus
160 communication control apparatus
210 distance measuring unit
212 range of monitoring direction
213 range of monitoring distance
214 spatial distance
214A spatial distance data
230 distance measuring unit
234 spatial distance
234A spatial distance data
310 condition memorizing unit
311 distance condition value
330 condition memorizing unit
331 distance condition value
340 condition memorizing unit
341 distance condition value
342 information operating type
410 communication unit
411 antenna
412 range of sensing direction
413 range of sensing distance
420 communication unit
425 notification on detection of communication request
440 communication unit
460 communication unit
461 antenna
464 electric power
465 notification on detection of communication request
630 condition setting unit
631 notification on detection of condition setting instruction
707 non-transitory computer-readable recording medium
911 external device
912 object

The invention claimed is:

1. A communication control apparatus, characterized by comprising:
    distance measuring unit which measures a spatial distance to an arbitrary object which exists within a specific range of distance and in an adjacent position;
    condition memorizing unit which stores a predefined distance condition; and
    communication unit which goes into a communication-enabled state depending on a comparison result between a value of said spatial distance and said distance condition, wherein the spatial distance is a distance between the communication control apparatus and the arbitrary object, and
    the specific range of distance is a predefined range of direction and a predefined range of distance from the communication control apparatus.

2. The communication control apparatus according to claim 1, characterized in that
    said communication means goes into the communication-enabled state to a communication request from an external unit in the case that the value of said spatial distance satisfies distance condition.

3. The communication control apparatus according to claim 1, characterized in that
    said distance measuring means measures said spatial distance in the case that said communication means detects the communication request from the an external unit.

4. The communication control apparatus according to any one of claim 1, characterized in that
    said distance measuring means measures said spatial distance at a predefined time interval.

5. The communication control apparatus according to any one of claim 1, characterized in that
    said specific range of distance is wider than at least a predefined range of distance in the direction where said communication means has a communication sensitivity.

6. The communication control apparatus according to any one of claim 1, characterized in that
    said condition memorizing means makes a plurality of said distance conditions correspondent to a plurality of predefined information operating types each other and memorizes them, and
    said communication means analyzes the communication request from an external unit, determines which information operating type among a plurality of said information operating types and selects said distance condition corresponding to the information operating type.

7. The communication control apparatus according to any one of claim 1, characterized by further comprising:
    condition setting unit which sets contents to said condition memorizing means and changes the contents which is set to said condition memorizing means.

8. The communication control apparatus according to any one of claim 7, characterized in that
    said condition setting means sets and changes said distance condition based on the spatial distance which said distance measuring means measured.

9. A communication control method for the communication device comprising storage means and communication means, characterized in that measuring a spatial distance to an arbitrary object which exists within a specific range of distance and in an adjacent position, and changing said communication means to a communication-enabled state depending on a comparison result between said value of the spatial distance and a predefined distance condition which is memorized in said storage means, wherein the spatial distance is a distance between the communication control apparatus and the arbitrary object, and the specific range of distance is a predefined range of direction and a predefined range of distance from the communication control apparatus.

10. The communication control method according to claim 9, characterized in that setting said communication means in the communication-enabled state to a communication request from an external unit in the case that the value of said spatial distance satisfies distance condition.

11. The communication control method according to claim 9, characterized in that measuring said spatial distance in accordance with detecting the communication request from an external unit.

12. The communication control method according to any one of claim 9, characterized in that measuring said spatial distance in a predefined time interval.

13. The communication control method according to any one of claim 9, characterized in that said specific range of distance is wider than at least a predefined range of distance in the direction where said communication means has a communication sensitivity.

14. The communication control method according to any one of claim 9, characterized in that said memorizing means makes a plurality of said distance conditions correspondent to a plurality of predefined information operating types each other and memorizes them, and analyzing the communication request from an external unit, determining which information operating type among a plurality of said information operating types and selecting said distance condition corresponding to the information operating type.

15. The communication control method according to any one of claim 9, characterized in that setting contents to said condition memorizing means and changing the contents which is set to said memorizing means.

16. The communication control method according to any one of claim 9, characterized in that setting and changing said distance condition based on measured said spatial distance.

17. A non-transitory computer-readable recording medium which records a program, characterized by executing with a computer which includes storage means for storing a predefined distance condition for executing a process in that measuring a spatial distance to an arbitrary object which exists within a specific range of distance and in an adjacent position, and setting a communication in a enabled state depending on a comparison result of a value of said spatial distance with a predefined distance condition which is stored in said storage means, wherein the spatial distance is a distance between the communication control apparatus and the arbitrary object, and the specific range of distance is a predefined range of direction and a predefined range of distance from the communication control apparatus.

18. The non-transitory computer-readable recording medium which records the program according to claim 17, characterized by executing with said computer for executing a process in that setting said communication in a enabled state to a communication request from an external unit in the case that a value of said spatial distance satisfies distance condition.

19. The non-transitory computer-readable recording medium which records the program according to claim 17, characterized by executing with said computer for executing a process in that measuring said spatial distance in accordance with detecting the communication request from an external unit.

20. The non-transitory computer-readable recording medium which records the program according to any one of claim 17, characterized by executing with said computer for executing a process in that measuring said spatial distance in a predefined time interval.

21. The non-transitory computer-readable recording medium which records the program according to any one of claim 17, characterized by executing with said computer for executing a process in that analyzing the communication request from an external unit, determining which information operating type among a plurality of predefined information operating types which are stored in said storage means and are respectively corresponding to a plurality of said distance conditions and the distance condition and selecting said distance condition corresponding to the information operating type.

22. The non-transitory computer-readable recording medium which records the program according to any one of claim 17, characterized by executing with said computer for executing a process in that setting and changing said distance condition which is stored in said storage means.

23. The non-transitory computer-readable recording medium which records the program according to any one of claim 17, characterized by executing with said computer for executing a process in that setting and changing said distance condition based on measured said spatial distance.

24. A communication control apparatus, characterized by comprising:

distance measuring means for measuring a spatial distance to an arbitrary object which exists within a specific range of distance and in an adjacent position;

condition memorizing means for storing a predefined distance condition; and communication means for goes into the communication-enabled state depending on a comparison result between a value of said spatial distance and said distance condition, wherein the spatial distance is a distance between the communication control apparatus and the arbitrary object, and the specific range of distance is a predefined range of direction and a predefined range of distance from the communication control apparatus.

* * * * *

UNITED STATES PATENT AND TRADEMARK OFFICE
CERTIFICATE OF CORRECTION

PATENT NO.         : 8,918,052 B2                                Page 1 of 1
APPLICATION NO.    : 13/513162
DATED              : December 23, 2014
INVENTOR(S)        : Norio Uchida It is certified that error appears in the above-identified patent and that said Letters Patent is hereby corrected as shown below:

In the Claims

Column 14, Line 29: In Claim 4, after "according to" delete "any one of"
Column 14, Line 33: In Claim 5, after "according to" delete "any one of"
Column 14, Line 38: In Claim 6, after "according to" delete "any one of"
Column 14, Line 49: In Claim 7, after "according to" delete "any one of"
Column 14, Line 54: In Claim 8, after "according to" delete "any one of"
Column 15, Line 17: In Claim 12, after "according to" delete "any one of"
Column 15, Line 21: In Claim 13, after "according to" delete "any one of"
Column 15, Line 26: In Claim 14, after "according to" delete "any one of"
Column 15, Line 37: In Claim 15, after "according to" delete "any one of"
Column 15, Line 42: In Claim 16, after "according to" delete "any one of"
Column 16, Line 16: In Claim 20, after "according to" delete "any one of"
Column 16, Line 22: In Claim 21, after "according to" delete "any one of"
Column 16, Line 34: In Claim 22, after "according to" delete "any one of"
Column 16, Line 40: In Claim 23, after "according to" delete "any one of"
Column 16, Line 52: In Claim 24, after "means" delete "for"

Signed and Sealed this
Twenty-eighth Day of July, 2015

Michelle K. Lee
*Director of the United States Patent and Trademark Office*